Patented July 5, 1932

1,865,496

UNITED STATES PATENT OFFICE

OSCAR E. J. ABRAHAMSON, OF BUFFALO, NEW YORK

PROCESS FOR OBTAINING COLLOIDAL CLAYS FROM ORDINARY SURFACE CLAYS

No Drawing. Application filed July 30, 1929. Serial No. 382,294.

This invention relates to a process for obtaining colloidal clays from ordinary surface clays.

It is well known that in the preparation of sand molds the sand should preferably contain certain colloids of inorganic nature, such as hydrated aluminum silicate, hydrated iron oxide, hydrated silica and other hydrated minerals, all of a gelatinous and sticky nature. It is the usual foundry practice to use the same sand over and over and as such usage gradually reduces the bonding constituents in the sand, it becomes essential that such constituents be restored in suitable degree.

It is the practice to add from time to time various materials to the sand which contain in concentrated form the colloids necessary to maintain the desired bonding properties. One of the most frequently used of such substances is a so-called colloidal clay which occurs for the most part in the western part of the United States and principally in the States of Wyoming and South Dakota. This clay is especially desirable because of the fact that as found in nature it is so nearly colloidal as to all of its constituents that it requires no special treatment for the purposes in view and a relatively small quantity of it will provide the necessary bonding effect. It is also desirable because while providing an ideal bond for the sand it does not detrimentally impair the permeability of the sand, that is to say its capacity to permit the ready escape of the gases from the metal with resultant avoidance of the boiling of the metal during the casting operation. Such clays, however, represent a substantial item in the cost of producing castings. Being practically all located in one section of the country they command a higher price than common clays and their cost is augmented by transportation charges.

There are, however, deposits of surface clays throughout the country which may be used for the purposes in view and may be purchased at a relatively low cost but they contain so many granular impurities that they are less desirable, the result of their use being a poorer grade of castings and higher casting losses. These surface clays contain substantial but varying percentages of colloidal and granular matter, in some cases about 50% of such colloidal matter and in other cases more or less.

The principal object of the invention is to provide a simple and economical method by which colloidal clays comparable in quality with the best western clays may be obtained from common surface clays, thereby to enable substantial savings to be effected in foundry operations.

When ordinary surface clays are for the purpose of laboratory observation thoroughly mixed with large percentages of water, the mixture thus having a low or small clay concentration, the heavier particles will readily settle to the bottom of the container while the remaining finer particles remain in suspension. These suspended particles constitute a colloidal clay having qualities which render it particularly desirable as a bonding agent, but heretofore no practical method for its recovery has been known.

In order to recover the clay constituted by these suspended particles I propose to treat a suitably concentrated mixture of surface clay and water to two differentiated centrifuging actions, the first having its factors so determined as to separate the heavier particles which would normally settle, which centrifuging is desirable because of the speed at which the separation of the heavier particles can be accomplished, and the second having its factors so determined as to separate the finer particles which are normally suspended in the liquid and which would not normally settle, at any rate, within such a period of time as to render settling a practical method for recovering these particles from the mixture.

In carrying out my process, I first treat a quantity of surface clay with water to provide a mixture of a suitable concentration such as 33% by weight of solids more or less. This solution is subjected to two centrifuging operations. In the first centrifuging, the rate of feed of the mixture into the centrifuge and the rate of rotation of the centrifuge are so controlled as not to effect the equilibrium in the mixture of the colloidal particles, which have been found to be substantially .0002" in diameter or less, it being understood that the word "colloidal" is used not primarily with reference to the nature of the material but with particular reference to the size of the particles, and as so used comprehends particles varying in size from approximately .0002" in diameter down, these particles including, of course, some true colloids. During this treatment, the heavier granular particles are thrown outwardly against the side of the bowl where they remain due to the centrifugal effect set up by the rotating bowl while the finer particles remain in solution unaffected by the action of the centrifuge. Hence, as the mixture of surface clay and water is fed constantly into the bowl and the heavier particles remain in the bowl, the liquid overflowing the sides of the bowl contains only the colloidal clay referred to previously as particles varying in size from .0002" in diameter down.

I have discovered that despite the apparent permanency of the suspension of the colloidal material in the liquid overflowing during the first centrifuging such material may be recovered from said liquid by a further centrifuging operation having its factors suitably determined.

In this further operation, the liquid drawn off from the first centrifuge is fed into a second centrifuge at a slower rate while the rate of rotation of the centrifuge is greatly increased. This second centrifuging action precipitates the remaining finer particles in the fluid upon the walls of the centrifuge. During this treatment, the water overflowing the sides of the bowl is normally substantially clear and continues thus until the bowl gets full of the colloidal matter at which time the water overflowing it becomes cloudy and the bowl should be emptied. The finer particles which are recovered during this second centrifuging resemble in many respects the so-called colloidal clay obtained heretofore from the Western States and possess many of the desirable qualities of such clay.

In carrying out my process with a centrifuge 12 inches in diameter operated at 500 R. P. M., a mixture of 33% concentration of surface clay and water was fed to the centrifuge at the rate of 30 gallons per hours. The liquid discharged was fed to a second centrifuge operating at 1500 R. P. M. at the rate of 5 gallons per hour.

It will be understood that my process may be carried out with a centrifuge of any suitable size and capacity and that the controlling factors, i. e. speed of rotation and rate of feed of the mixture may be varied as required by the varying circumstances of use. These having been determined the variations of the controlling factors will be readily computed by anyone skilled in the art.

Having fully described my invention, I claim:

1. The method of treating surface clay to separate therefrom the colloidal clay suitable for replacing in molding sand those constituents dissipated during the use of the sand which consists in forming a mixture of the surface clay and water, so centrifuging the mixture as to remove the heavy granular particles which are above the order of .0002 inches in diameter while not affecting the equilibrium in the mixture of the colloidal particles below the order of .0002 inches in diameter, and subjecting the remainder of the mixture to a second centrifuging action to recover the said colloidal particles contained therein.

2. The process of treating surface clay to separate therefrom the colloidal clay suitable for replacing in molding sand those constituents dissipated during the use of the sand which consists in forming a mixture of the surface clay with water of substantially 33% concentration feeding the mixture to a centrifuge rotating at a speed sufficient to remove the granular particles above the order of .0002 inches in diameter from the mixture, the speed of rotation being insufficient to affect the colloidal particles suspended in the mixture below the order of .0002 inches in diameter and feeding the remainder of the mixture discharged from this centrifuge to a second centrifuge operating at a greater speed, this latter centrifuging action being sufficient to remove the said remaining colloidal particles contained therein.

In testimony whereof I affix my signature.

OSCAR E. J. ABRAHAMSON.